Dec. 2, 1930. C. MORRIS ET AL 1,783,517
RAILROAD MOWING MACHINE
Filed Oct. 18, 1928 2 Sheets-Sheet 1
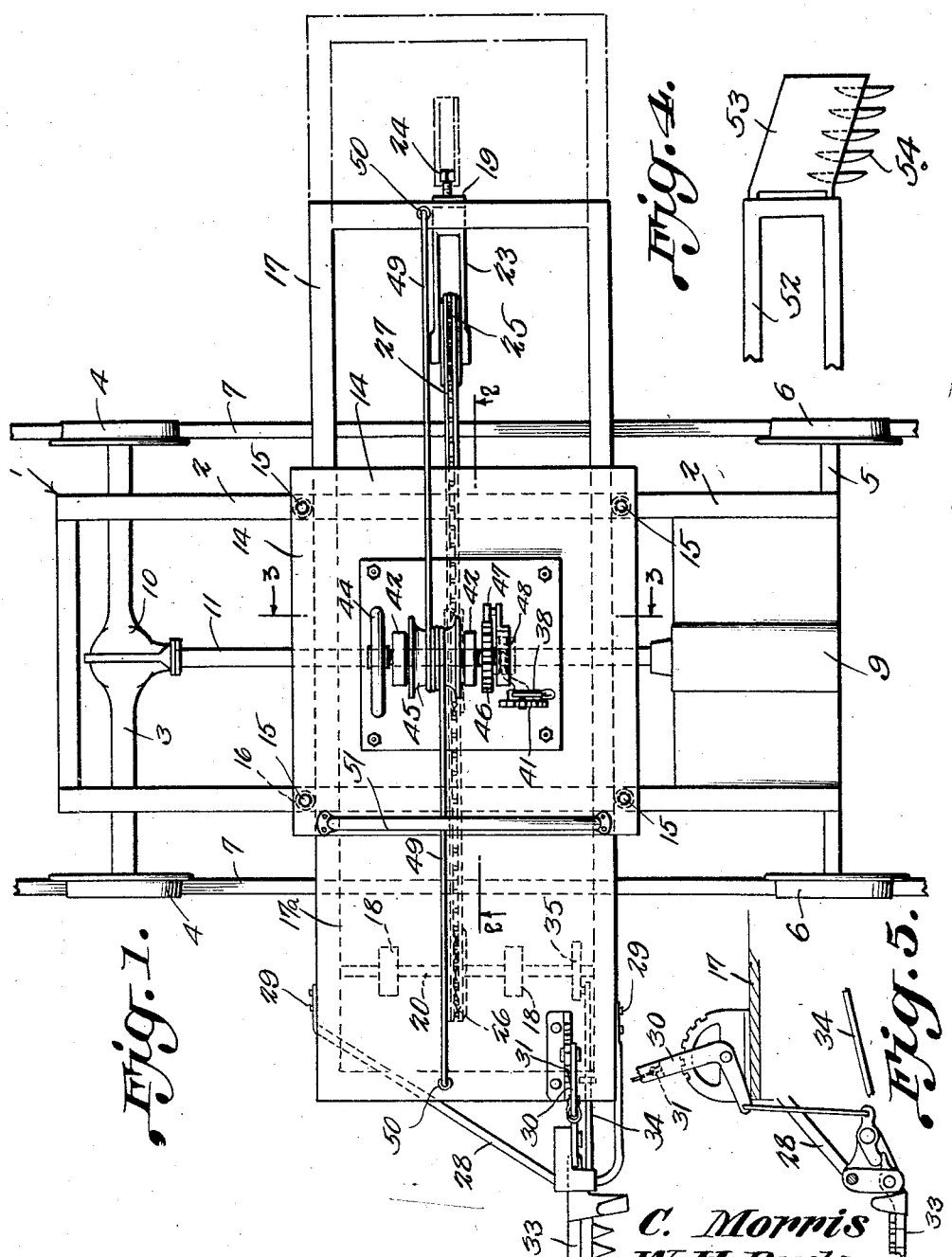
C. Morris
W. H. Buck Inventors
By C.A.Snow & Co.
Attorneys.

Dec. 2, 1930. C. MORRIS ET AL 1,783,517
RAILROAD MOWING MACHINE
Filed Oct. 18, 1928  2 Sheets-Sheet 2
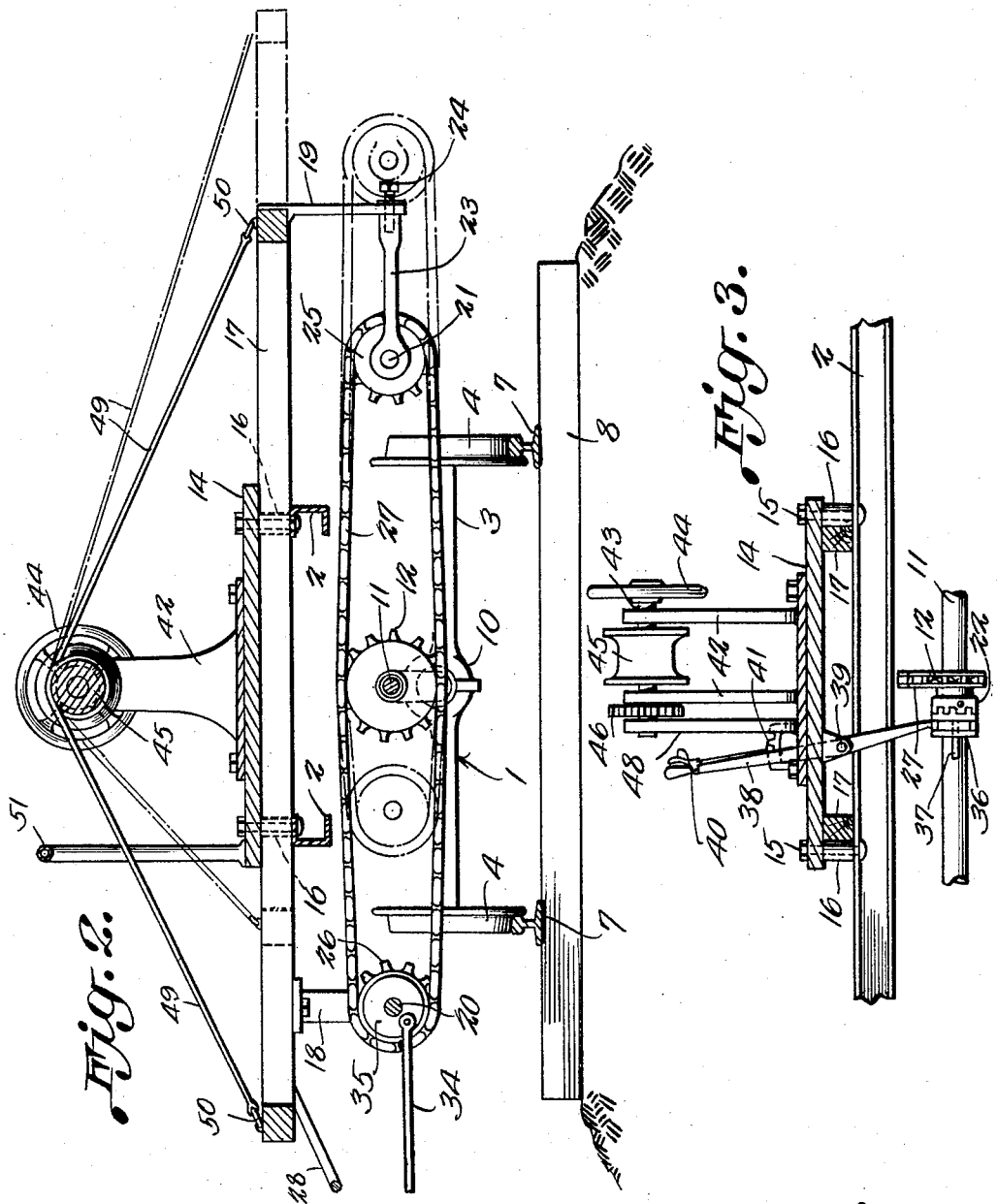
C. Morris
W. H. Buck
Inventor
By C. A. Snow & Co.
Attorneys.

Patented Dec. 2, 1930

1,783,517

UNITED STATES PATENT OFFICE

CARL MORRIS AND WILLIAM H. BUCK, OF THORNTON, IOWA, ASSIGNORS OF ONE-THIRD TO ORIE INFELT, OF THORNTON, IOWA

RAILROAD MOWING MACHINE

Application filed October 18, 1928. Serial No. 313,343.

This invention aims to provide a simple and efficient means whereby, as a vehicle moves along a railroad track, the grass and weeds at the sides of the track may be cut down.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in top plan, a device constructed in accordance with the invention, parts being broken away;

Figure 2 is a section on the line 2—2 of Figure 1;

Figure 3 is a section on the line 3—3 of Figure 1;

Figure 4 is a fragmental plan showing modifications;

Figure 5 is a detail from the preferred form of the invention.

In carrying out the invention, there is provided a vehicle 1, including a main frame 2. The rear axle housing is shown at 3, and the rear wheels appear at 4. A forward axle 5 is mounted on the frame 2 and carries the forward wheels 6. The wheels 4 and 6 are adapted to move along the rails 7 of a railroad track, the ties being indicated at 8. On the forward end of the vehicle frame 2 there is mounted an engine 9 connected at 10, by the usual means, with the rear wheels 4 to impart rotation thereto. The propelling means 10 includes a shaft 11 which will be alluded to hereinafter.

A sprocket wheel 12 turns on the shaft 11 and carries a clutch member 22. The clutch member 22 is adapted to cooperate with a clutch member 36 which is splined at 37 to the shaft 11, the clutch member 36 being operated by means of a lever 38 fulcrumed at 39 on a main platform 14, which will be described hereinafter. The lever 38 is supplied with a latch mechanism 40 adapted to cooperate with a segment 41 on the platform 14.

The platform 14, hereinbefore mentioned, is held by securing elements 15 upon the main frame 1. The rollers 16, which serve as guides, are journalled on the securing elements 15, between the platform 14 and the frame 2. An auxiliary frame 17 is supported for sliding movement transversely of the track rails 7, between the platform 14 and the main frame 2, the auxiliary frame 17 sliding between the rollers 16. The frame 17 is provided with depending hangers 18, located near to one end of the frame. Near to its opposite end, the auxiliary frame 17 has a depending hanger 19. A shaft 20 is mounted to rotate in the hangers 18. A shaft 21 is provided, and is carried by the inner end of a yoke 23. The yoke 23 is connected by a screw 24 or equivalent means, with the hanger 19. The shaft 21 carries a sprocket wheel 25. There is a sprocket wheel 26 on the shaft 20. A sprocket chain 27 is engaged around the sprocket wheels 26 and 25.

The upper run of the chain 27 engages the upper portion of the sprocket wheel 12, and the lower run of the sprocket chain 27 engages the lower portion of the sprocket wheel 12.

The numeral 28 designates a carrier, shown in outline in Figure 1. Generally stated, the carrier 28 is U-shaped in top plan. The ends of the carrier 28 are secured at 29 to the sides of the auxiliary frame 17. On the outer end of the carrier 28 is located a cutting mechanism 33 which need not be described in detail, the cutting mechanism, preferably, being of the reciprocating cutter bar type, and being actuated by a pitman 34 which is pivoted to a crank disc 35 on the shaft 20. Any suitable means may be provided for adjusting the cutting mechanism up and down. If desired, as shown in Figure 5, a lever 30 having a latch mechanism 31 adapted to cooperate with a segment carried by the auxiliary frame 17 may be used.

Standards 42 and 48 are erected on the platform 14. In the standards 42 is journalled a shaft 43 which may be operated by a hand wheel 44, or in any suitable way. A drum 45 is secured to the shaft 43. The shaft 43 carries a toothed wheel 46. A dog 47 is adapted to cooperate with the wheel 46, to hold the shaft 43 against rotation, the dog 47 being pivotally mounted on the support 48. Flexible elements 49 are wound in opposite directions about the drum 45.

The outer ends of the flexible elements 49 are connected at 50 to the outer ends of the auxiliary frame 17. For the convenience of an operator, a hand rail 51 may be mounted on the platform 14.

In practical operation, the engine 9 operates the shaft 11 and the mechanism shown at 10, motion being imparted to the rear wheels 4, and the vehicle 1 being propelled along the track rails 7. The clutch 36, cooperating with the clutch 22, couples the sprocket wheel 12 to the shaft 11, and when the shaft 11 is rotated, the wheel 12 will be driven also. The operator can stop the rotation of the wheel 12 at any time, by disengaging the clutch 36 from the clutch 22, by means of the lever 38.

When the wheel 12 is rotated, motion will be imparted to the sprocket chain 27, and the sprocket wheel 26 will rotate the shaft 20, the crank disc 35 being rotated, and the pitman 34 operating the cutting mechanism, to sever the grass and weeds at the side of the track. The aforesaid cutting mechanism 33, may be adjusted up and down, from the auxiliary platform 17a, by means of the hand lever 30, and may be held in an adjusted position by engaging the latch mechanism 31 with the segment 32.

The function of the screw 24 is to move the yoke 23 in and out, so that the yoke will act as a tightener for the sprocket chain 27.

When the operator wishes to shift the auxiliary platform in and out with respect to the main platform 14, or to shift the cutting mechanism in and out, thereby to adjust it transversely of the track rails 7, this may be done by turning the hand wheel 44. When the hand wheel 44 is turned, the shaft 43 is rotated, and rotation is imparted to the drum 45. When the drum 45 is rotated, one of the flexible elements 49 will be reeled on the drum 45, and the other of the flexible elements will be paid off the drum.

In this way, the auxiliary frame 17 and the cutting mechanism 33 may be moved cross-wise of the vehicle, so as to shift the cutting mechanism 33 in or out. After the adjustments have been made, the dog 47 may be engaged with the toothed wheel 46 to hold the frame 17 against endwise movement.

In the modification shown in Figure 4 of the drawings, the auxiliary frame, corresponding to the frame 17, is designated by the numeral 52. On the frame 52 is mounted a support 53, corresponding to the support 28. The support 53, however, has soil engaging elements, such as cultivator discs 54, adapted to break up the earth along the right of way, when such an operation is considered desirable, more specifically, the gravel shoulder immediately adjacent to the end of the railroad ties 8 for a distance of 2 or 3 feet.

Having thus described the invention, what is claimed is:—

1. In a device of the class described, a vehicle including a main frame, a main platform disposed above the main frame, and connections between the main frame and the main platform; a rectangular frame slidable between the main frame and the main platform and held by contact therewith, against vertical tilting movement, the rectangular frame being slidable between the connections and being held by contact therewith against horizontal swinging movement, means for mounting the vehicle for movement along a railroad track, a shaft journaled on the rectangular frame, at one end thereof, outwardly of one side of the track, a tightener carried by the opposite end of the rectangular frame, outwardly of the opposite side of the track, sprocket wheels on the shaft and on the tightener, a sprocket chain engaging the sprocket wheels, means for driving the sprocket chain, mechanism on the first specified end of the rectangular frame for working on the right of way at the first specified side of the track, and means for connecting said mechanism operatively with the shaft.

2. In a device of the class described, a vehicle including a main frame, a main platform disposed above the main frame, and connections between the main frame and the main platform; a movable frame slidable between the main frame and the main platform and held by contact therewith against vertical tilting movement, the movable frame being slidable between the connections and being held by contact therewith, against horizontal swinging movement, an auxiliary platform on one end of the movable frame, mechanism on said end of the movable frame for working along a right of way, means accessible to a person on the auxiliary platform for controlling said mechanism, and means accessible to a person on the main platform for imparting sliding movement to the movable frame transversely of the line of advance of the vehicle, thereby to move the auxiliary platform toward and away from the main platform, and to shift said mechanism inwardly and outwardly with respect to the track.

In testimony that we claim the foregoing as our own, we have hereto affixed our signatures.

CARL MORRIS.
WILLIAM H. BUCK.